(12) United States Patent
Ootomo et al.

(10) Patent No.: US 8,077,073 B2
(45) Date of Patent: Dec. 13, 2011

(54) PULSE DETECTING EQUIPMENT

(75) Inventors: Hisashi Ootomo, Kawasaki (JP);
Yoshirou Aoki, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 65 days.

(21) Appl. No.: 12/690,357

(22) Filed: Jan. 20, 2010

(65) Prior Publication Data
US 2010/0315283 A1 Dec. 16, 2010

(30) Foreign Application Priority Data

Jun. 11, 2009 (JP) .................. 2009-139879

(51) Int. Cl.
*G01S 13/00* (2006.01)
*G01S 13/74* (2006.01)
*G01S 13/08* (2006.01)
(52) U.S. Cl. ............. 342/47; 342/36; 342/42; 342/46
(58) Field of Classification Search ............ 342/36–38, 342/42, 46, 47, 59, 125
See application file for complete search history.

(56) References Cited

U.S. PATENT DOCUMENTS

| | | | | |
|---|---|---|---|---|
| 2,979,609 | A * | 4/1961 | Biagi | 455/226.2 |
| 3,953,802 | A * | 4/1976 | Morris et al. | 375/349 |
| 3,969,725 | A * | 7/1976 | Couvillon et al. | 342/47 |
| 4,646,097 | A * | 2/1987 | King | 342/95 |
| 5,341,141 | A * | 8/1994 | Frazier et al. | 342/59 |
| 7,161,528 | B2 * | 1/2007 | Kirby et al. | 342/159 |
| 7,443,334 | B2 * | 10/2008 | Rees et al. | 342/29 |
| 7,683,823 | B2 * | 3/2010 | Kamimura | 342/47 |
| 2009/0033541 | A1 * | 2/2009 | Kamimura | 342/47 |
| 2010/0315283 | A1 * | 12/2010 | Ootomo et al. | 342/47 |

FOREIGN PATENT DOCUMENTS
JP 2009-14398 1/2009

OTHER PUBLICATIONS

"Aeronautical Telecommunications", Annex 10, International Civil Aviation Organization, Fifth Edition of vol. I, Jul. 1996, 4 pages.
"Minimum Operational Performance Specification for Distance Measurement Equipment (DME/N and DME/P)," The European Organisation for Civil Aviation Equipment, ED-57, Dec. 1986, 4 pages.
Office Action issued Oct. 8, 2010 in Australian Patent Application No. 2010200222.

* cited by examiner

*Primary Examiner* — Thomas Tarcza
*Assistant Examiner* — Peter Bythrow
(74) *Attorney, Agent, or Firm* — Oblon, Spivak, McClelland, Maier & Neustadt, L.L.P.

(57) ABSTRACT

A pulse detecting equipment includes a log compression processor (105) for logarithm-converting signal levels of a reception signal received at an antenna and input therefrom, with maintained frequency components of the reception signal as input, an AD converter (106) for converting the reception signal as logarithm-converted in signal level, from an analog form into a digital form, a first detector (110) for limiting the reception signal as converted into the digital form to a band of a prescribed first frequency, to obtain a signal, to detect signal levels thereof, a second detector (111) for limiting the reception signal as converted into the digital form to a band of a prescribed second frequency smaller than the first frequency, to obtain a signal, to detect signal levels thereof, and a pulse detector (113) for use of a result of comparison between signal levels detected at the first detector and signal levels detected at the second detector, to detect pulses of a prescribed frequency as a signal transmitted to own equipment.

2 Claims, 7 Drawing Sheets

FIG. 8

| COMPARISON RESULTS | DETERMINATION RESULTS | OUTPUT SIGNALS |
|---|---|---|
| L1≦L2 | CHANNEL-INSIDE OUTPUT | PULSE DETECTION CONTROL SIGNAL |
| L1>L2 | CHANNEL-OUTSIDE OUTPUT | PULSE DETECTION SUPPRESSION SIGNAL |

PULSE DETECTING EQUIPMENT

CROSS REFERENCE TO RELATED APPLICATIONS

The present application claims the benefit of priority under 35 U.S.C. §119 to Japanese patent application No. 2009-139879, filed on Jun. 11, 2009, the entire contents of which are incorporated herein by reference.

BACKGROUND OF THE INVENTION

1. Field of Art

The present invention relates to a pulse detecting equipment for detecting pulses aircraft 6 has transmitted or received to grasp its location.

2. Description of Relevant Art

Flying aircraft determines the location in a variety of manners, including the method of using a DME (distance measuring equipment), refer to Japanese patent application Laid-Open Publication No. 2009-14398.

The DME is installed as equipment on the ground, as illustrated in FIG. 1. It receives pulses transmitted from aircraft 6, and transmits to aircraft 6 pulses responding the received pulses. The aircraft 6 determines its flying location using pulses transmitted to and received from a first, a second, or a third DME 5a, 5b, or 5c (referred herein to collectively as a DME 5).

FIG. 2 shows as an example a pair of interrogation pulses P1 transmitted from aircraft 6. Having received interrogation pulses P1 transmitted from aircraft 6, the DME 5 works, with lapse of a predetermined time (Td) after the reception of interrogation pulses P1, to transmit reply pulses P2 responding the interrogation pulses P1. Having received reply pulses P2 transmitted from the DME 5, the aircraft 6 is measuring a distance from the DME 5 to the aircraft 6 depending on a propagation velocity of electric waves (as a signal) and a response time T determined from combination of a transmission time t1 of interrogations pulses P1 and a reception time t2 of reply pulses P2.

Such interrogation pulses P1 as well as reply pulses P2 are paired as twin pulses in compliance with an international prescript per mode of operation, covering the pulse spacing, delay interval, etc, cf. refer to "Aeronautical Telecommunications, ANNEX10, VOLUME I" issued from the ICAO, Jul. 1996, pp. 27-40).

For instance, for the DME/N mode, interrogation pulses P1 as well as reply pulses P2 have a pulse width of 3.5 µs, and a pulse spacing of 12 µs. For respective DMEs 5, frequencies of pulses to be transmitted and received are individually prescribed. In the example of FIG. 1, the first DME 5a has a frequency of reception pulses prescribed as 961 MHz, the second DME 5b, a frequency of reception pulses prescribed as 960 MHz, and the third DME 5c, a frequency of reception pulses prescribed as 962 MHz.

The first DME 5a is adapted, as illustrated in FIG. 3, to reply simply to reception of interrogation pulses P1 within a range about a prescribed frequency (961 MHz), and not to respond interrogation pulses P1 to neighboring channels (960 MHz, 962 MHz) even upon reception of any them. In other words, the DME 5 is configured to detect interrogation pulses P1 within a prescribed frequency range from among received signals, and transmit reply pulses P2 within a prescribed frequency range. It is noted FIG. 1 shows values of frequencies designated for reception of interrogation pulses P1, which are different from frequencies designated for reply pulses P2.

(Analog System)

Accordingly, the DME 5 is provided with a pulse detecting equipment mounted thereto for detecting interrogation pulses P1 transmitted from aircraft 6 to own equipment.

FIG. 4 shows a typical pulse detecting equipment 2 of analog system as an example, which includes: an RF (Radio Frequency) amplifier 202 for amplifying signals (RF (Radio Frequency) signals) received at an antenna 201; a mixer 204 for mixing received signals with RF signals of a prescribed frequency output from an oscillator 203, to provide IF (Intermediate Frequency) signals; a first filter 205 for limiting a frequency band of signals input from the mixer 204, to a first frequency band (900 kHz); a second filter 206 for limiting a frequency band of signals input from the mixer 204, to a second frequency band (150 kHz); a first diode detector 207 for wave detection of signal levels of signals input from the first filter 205; a second diode detector 208 for wave detection of signal levels of signals input from the second filter 206; a comparator 209 for comparison between signals detected at the diode detector 207 and 208; and a pulse detector 210 employing results of comparison of the comparator 209, to detect interrogation pulses P1 transmitted to own equipment. Afterward, the DME 5 provided with the pulse detecting equipment 2 works to generate, to transmit to aircraft 6, reply pulses P2 responding to interrogation pulses P1 detected by the pulse detecting equipment 2.

The pulse detecting equipment 2 of analog system has internal circuitry of analog system, including the first filter 205 and the second filter 206 as analog circuit components difficult in adjustments for characteristic balances, as a problem. Even of a sort, analog circuit components have different characteristics by individual components, with the need of selecting a balanceable component from among given components. Further, analog components are subject to deterioration, with anxieties that the filters 205 and 206, even if initiated with balanced characteristics, might lose characteristic balances during a service, affecting pulse detection.

(Digital System)

To solve the problem in analog system the filters 205 and 206 might suffer in adjustment of characteristic balance, there are pulse detecting equipments of digital system free of adjustments of the filters 205 and 206.

FIG. 5 shows a typical pulse detecting equipment 3 of digital system as an example, which includes: an RF (Radio Frequency) amplifier 32 for amplifying signals (RF (Radio Frequency) signals) received at an antenna 31; a mixer 34 for mixing received signals with RF signals of a prescribed frequency output from an oscillator 33, to provide IF signals; a high-level signal processor 35 for processing high-level signals; a low-level signal processor 36 for processing low-level signals; a comparator 37 for comparison between signals wave-detected at the high-level signal processor 35 and signals wave-detected at the low-level signal processor 36; and a pulse detector 38 employing results of comparison of the comparator 37, to detect interrogation pulses P1 transmitted to own equipment.

This pulse detecting equipment 3 is employed for detection of interrogation pulses P1 transmitted from aircraft 6, and is required to cope with signal levels (amplitude levels) of interrogation pulses P1. On the other hand, AD (Analog Digital) converters are subject to restriction to signal levels they can cope with, so it is impractical to use an AD converter for processing a range of signals covering from high level signals to low level signals received from aircraft 6, without adjusting their levels. However, adjusting levels of signals may change frequencies of some signals. Accordingly, the pulse detecting equipment 3 is configured at the high-level signal processor 35 for processing received signals of high levels within a working range of an AD (Analog Digital) converter 352, and at the low-level signal processor 36 for processing received signals of low levels within a working range of an AD (Analog Digital) converter 362, in a separately processing manner, to combine respective results together for detection of interrogation pulses P1, permitting interrogation pulses P1 to be detected with maintained frequency information.

The high-level signal processor 35 is configured with: an adjuster 351 for adjustment in level (amplification or attenuation) of signals input from the mixer 34; the above-noted AD converter 352 for conversion of level-adjusted high-level signals (that can be processed within an unsaturated working region of the AD converter with standard-compliant maximum power) from analog signals to digital signals; a down-converter 353 for conversion to down-convert digitalized signals into complex data (IQ (In phase Quadrature phase) data); a first filter 354 for limiting a frequency band of signals converted into IQ data, to a first frequency band (900 kHz); a second filter 355 for limiting a frequency band of signals converted into IQ data, to a second frequency band (150 kHz); a first detector 356 for wave detection of levels of signals input from the first filter 354; and a second detector 357 for wave detection of levels of signals input from the second filter 355.

Likewise, the low-level signal processor 36 is configured with: an adjuster 361 for adjustment in level (amplification or attenuation) of signals input from the mixer 34; the above-noted AD converter 362 for conversion of level-adjusted low-level signals (that can be detected at standard-compliant minimum power) from analog signals to digital signals; a down-converter 363 for conversion to down-convert digitalized signals into complex data (IQ data); a first filter 364 for limiting a frequency band of signals converted into IQ data, to a 900 kHz frequency band; a second filter 365 for limiting a frequency band of signals converted into IQ data, to a 150 kHz frequency band; a first detector 366 for wave detection of levels of signals input from the first filter 364; and a second detector 367 for wave detection of levels of signals input from the second filter 365.

Accordingly, the high-level signal processor 35 is adapted to accurately detect simply high-level signals to output, and inadaptable for accurate detection of low-level signals. On the other hand, the low-level signal processor 36 is adapted to accurately detect simply low-level signals to output, and inadaptable for accurate detection of high-level signals that become saturated.

Therefore, the comparator 37 comparing signals input form the detectors 356, 357 and 366, 367 is adapted to work, if the reception signal is a high level, to output to the pulse detector 38 an input signal from the high-level signal processor 35, and if the reception signal is a low level, to output to the pulse detector 38 an input signal from the low-level signal processor 36.

By provision of the pulse detecting equipment 3 of digital system, the DME 5 can detect interrogation pulses P1 transmitted to own equipment, and generate reply pulses P2 responding interrogation pulses P1 to own equipment, to transmit to aircraft 6.

However, for a dynamic range (a necessary range for adaptation to low and high signal levels) to be secured, the pulse detecting equipment 3 of digital system needs a pair of processors being the high-level signal processor 35 and the low-level signal processor 36, with a complicated equipment configuration, as a problem.

As described, the pulse detecting equipment 2 of typical analog system includes a combination of first analog filter and second analog filter difficult of adjustment, as a problem. On the other hand, the pulse detecting equipment 3 of digital system needs a complicated equipment configuration, as a problem.

To this point, it is an object of the present invention to provide a pulse detecting equipment with a simplified equipment configuration allowing for facilitated pulse detection.

SUMMARY OF THE INVENTION

According to an aspect of the present invention, a pulse detecting equipment comprises a logarithmic compression processor configured to logarithm-convert signal levels of a reception signal received at an antenna and input therefrom, with maintained frequency components of the reception signal as input, an AD (Analog Digital) converter configured to convert the reception signal as logarithm-converted in signal level, from an analog form into a digital form, a first detector configured to limit the reception signal as converted into the digital form to a band of a prescribed first frequency, to obtain a signal, to detect signal levels thereof, a second detector configured to limit the reception signal as converted into the digital form to a band of a prescribed second frequency smaller than the first frequency, to obtain a signal, to detect signal levels thereof, and a pulse detector configured for use of a result of comparison between first signal levels detected at the first detector and second signal levels detected at the second detector, to detect pulses of a prescribed frequency as a signal transmitted to own equipment.

BRIEF DESCRIPTION OF THE DRAWINGS

FIG. 8 is a table showing a result of comparison of the comparator.

DETAILED DESCRIPTION OF THE EMBODIMENTS

Figure 4:
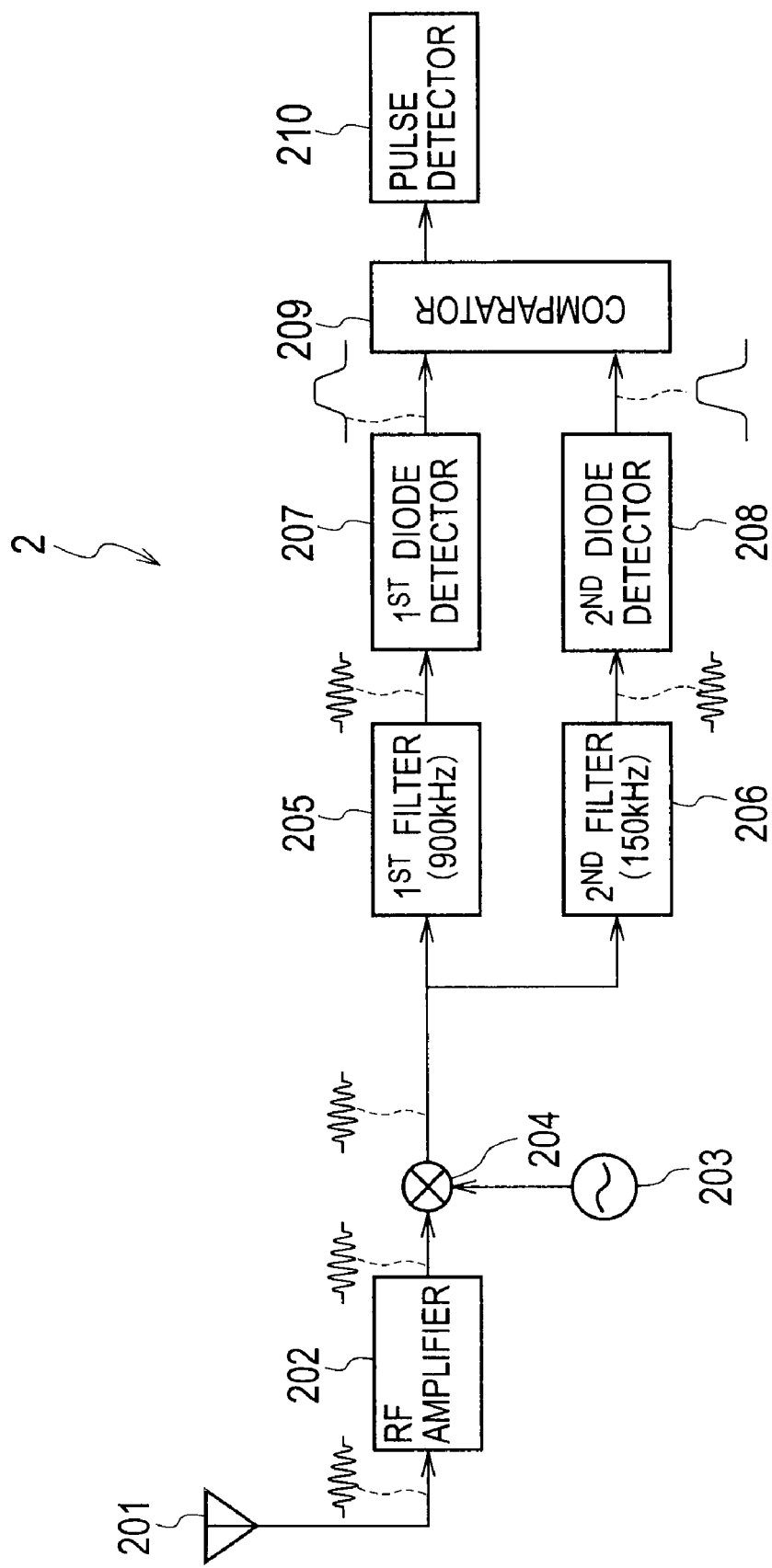
FIG. 4 is a functional block diagram of a typical example of pulse detecting equipment of analog system.
Figure 5:
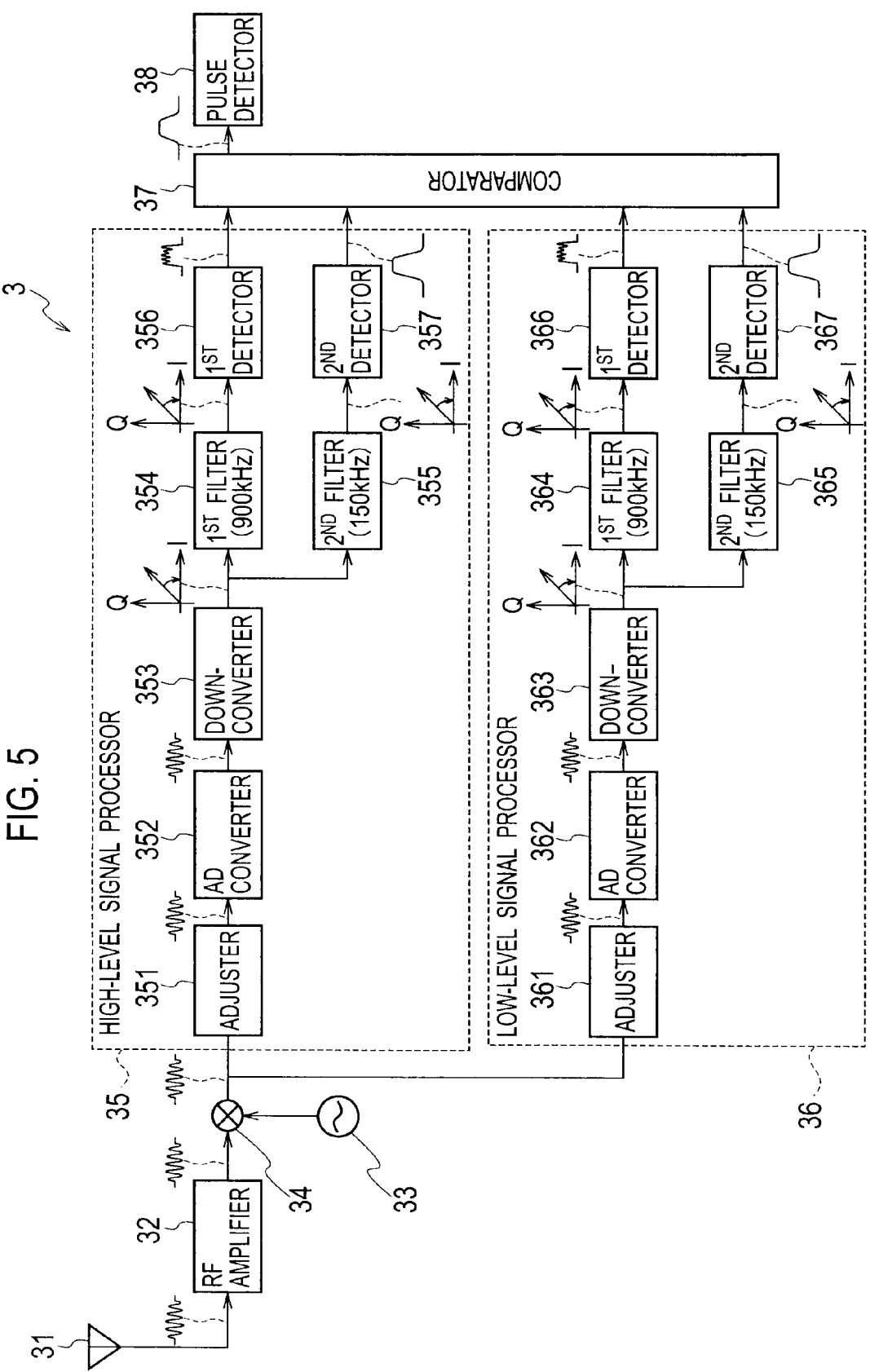
FIG. 5 is a functional block diagram of a typical example of pulse detecting equipment of digital system.
Figure 6:
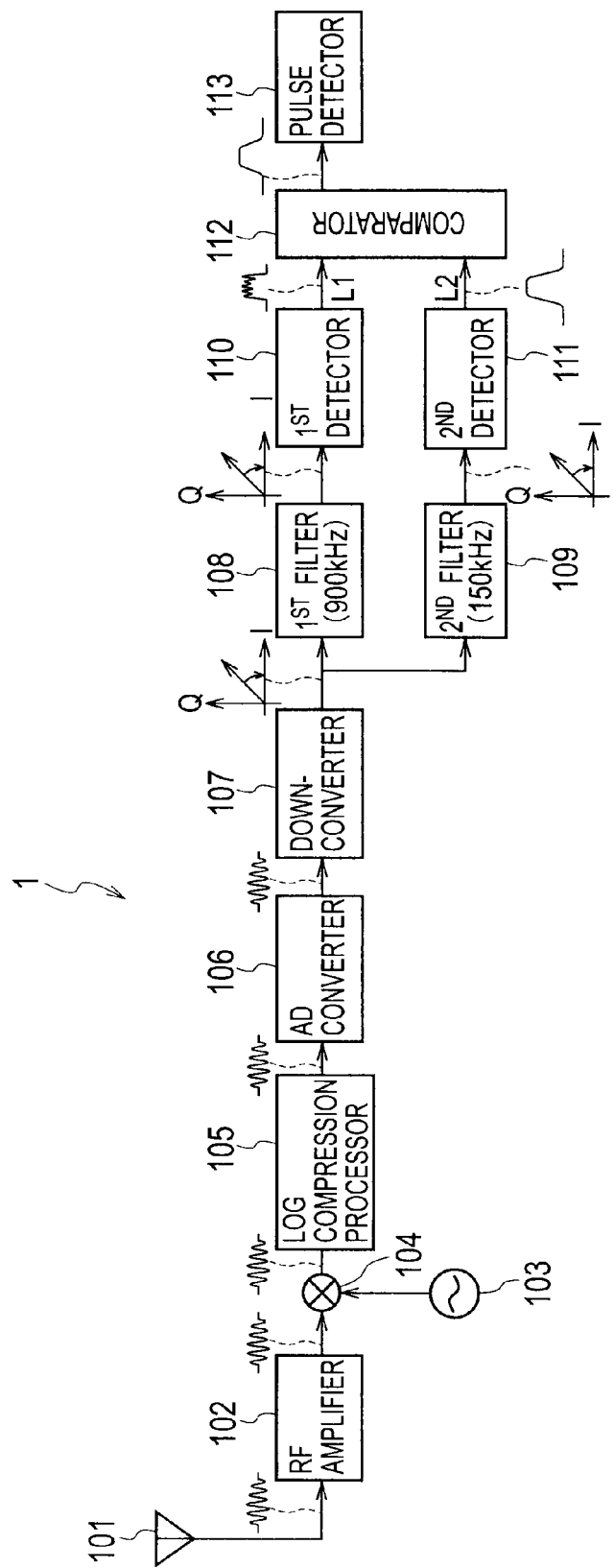
FIG. 6 is a functional block diagram of a pulse detecting equipment according to a best mode of embodiment of the present invention.

Referring to FIG. 6, description is now made of a pulse detecting equipment 1 according to the best mode of embodiment of the present invention. Like the pulse detecting equipment 2 shown in FIG. 4 or the pulse detecting equipment 3 shown in FIG. 5, the pulse detecting equipment 1 shown in FIG. 6 is implemented to a DME 5 installed at a ground station, and adapted to detect interrogations pulses P1 transmitted from a transponder mounted on aircraft 6.

The pulse detecting equipment 1 includes: an RF (Radio Frequency) amplifier 102 configured for amplification of a reception signal (an RF (Radio Frequency) signal) received at an antenna 101; a mixer 104 configured for a mixing between the reception signal and an RF signal of a prescribed frequency output from an oscillator 103, to provide an IF signal; a log compression processor 105 configured for a logarithmic conversion of the reception signal as mixed at the mixer 104; an AD (Analog Digital) converter 106 configured for a digital conversion of the reception signal as a logarithm-converted analog signal; a down-converter 107 configured to down-convert the digital-converted signal, for conversion into complex data (IQ (In phase Quadrature phase) data); a first filter 108 configured to limit a frequency band of the reception signal as converted into IQ data, to a first frequency band (900 kHz); a second filter 109 configured to limit a frequency band of the reception signal as converted into IQ data, to a second frequency band (150 kHz); a first detector 110 configured for wave detection of a set of signal levels (as a first detection signal) L1 of a signal input from the first filter 108; a second detector 111 configured for wave detection of a set of signal levels (as a second detection signal) 12 of a signal input from the second filter 109; a comparator 112 configured for comparison between the set of signal levels L1 wave-detected at the first detector 110 and the set of signal levels L2 wave-detected at the second detector 111; and a pulse detector 113 configured to employ results of comparison of the comparator 112, for detection of pulses.

The pulse detecting equipment 1 has the log compression processor 105, which is configured for a logarithmic conversion of signal intensities of the reception signal, with maintained frequency components, permitting a dynamic range (of amplitude levels) of the reception signal to fit to a working region of the AD converter 106 corresponding to a performance of the pulse detecting equipment 1. Therefore, unlike the pulse detecting equipment 3 of digital system in FIG. 5, the pulse detecting equipment 1 in FIG. 6 does not need the use of a combination of a high-level signal processor 35 for processing high-level reception signals and a low-level signal processor 36 for processing low-level reception signals to provide a secured range for signal levels (amplitude levels) of reception signals.

Figure 1:
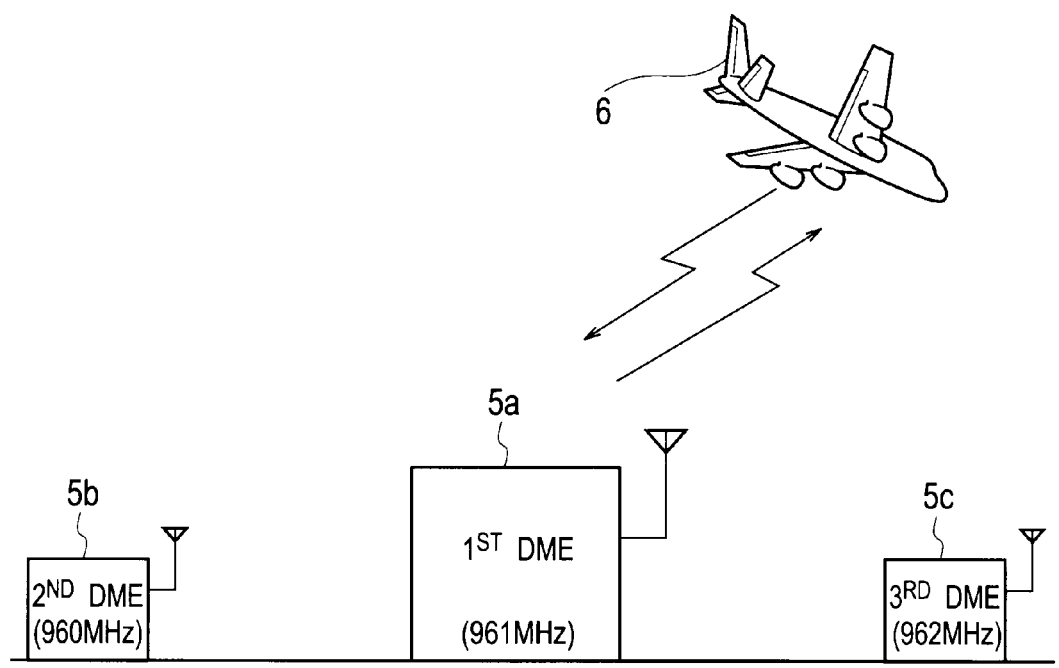
FIG. 1 is an explanatory diagram of a typical DME.
Figure 2:
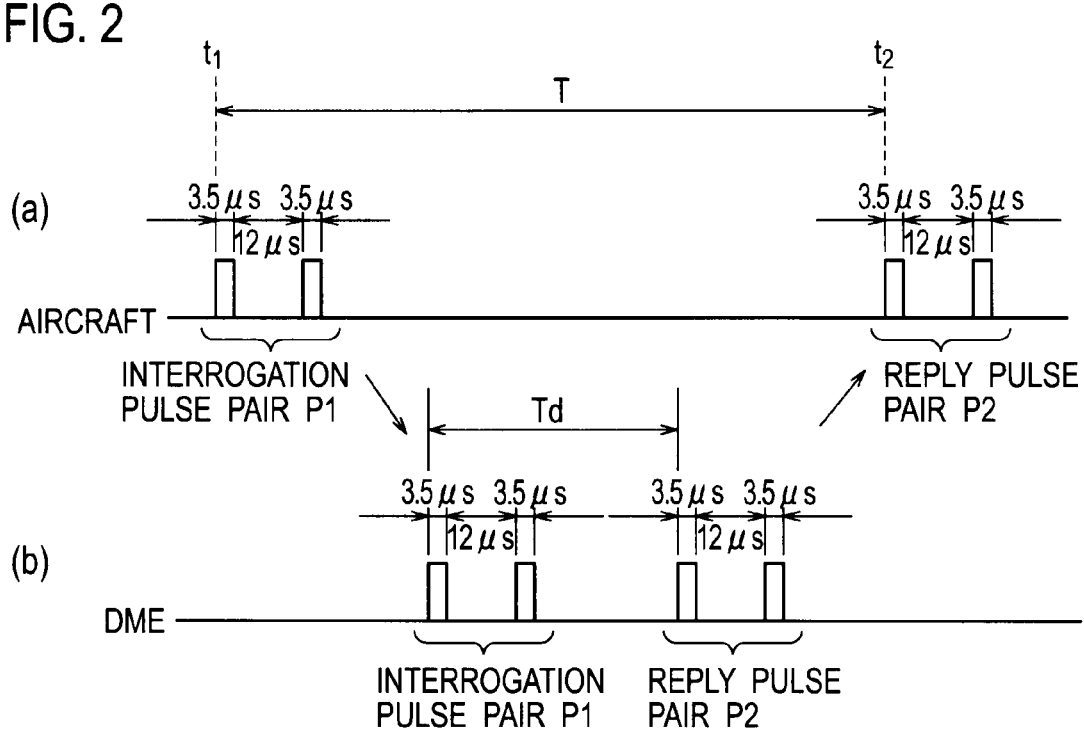
FIGS. 2(a) and 2(b) are time charts of pulses transmitted and received between aircraft and DME.
Figure 3:
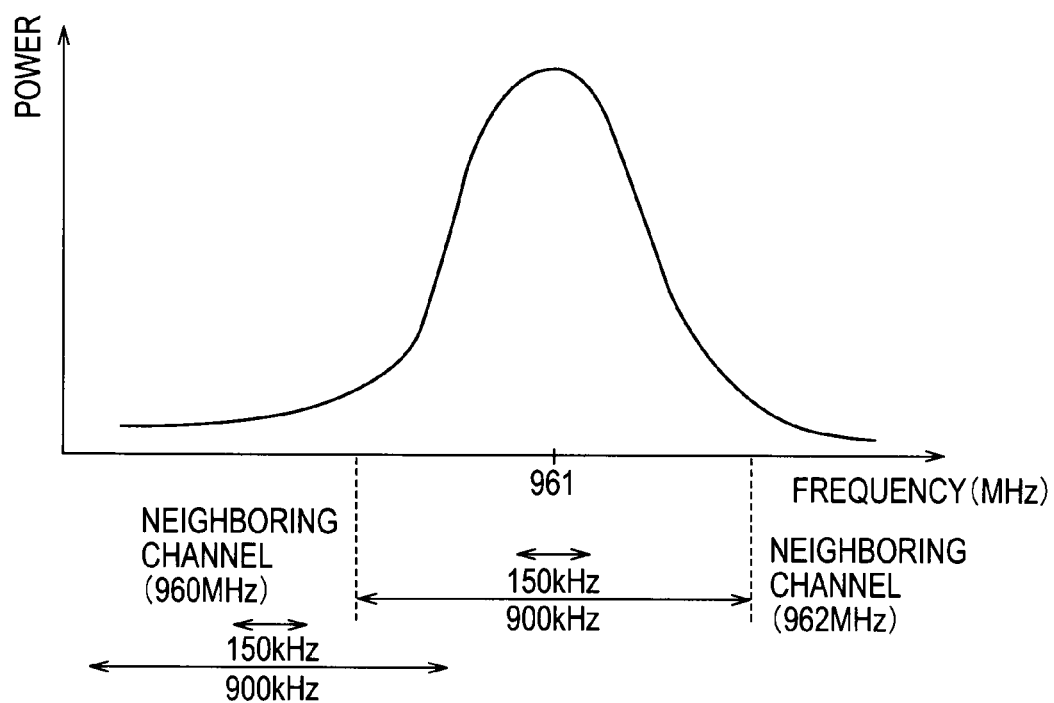
FIG. 3 is a graph illustrating a signal to be processed at DME.

As described with reference to FIG. 1 and FIG. 3, the DME 5 has prescript-compliant unique frequencies prescribed for interrogation pulses P1 to be received and reply pulses P2 to be transmitted. Prescribed frequencies for respective DMEs are mutually different by 1 MHz or more. Receiving interrogation pulses P1, the DME 5 is required to determine whether a respective interrogation pulse pair received there is an interrogation P1 to own equipment or an interrogation P1 to any neighboring channel. For the determination, assuming e.g. a difference of 1 MHz between a prescribed frequency for own equipment and prescribed frequencies for neighboring channels, the DME 5 has to limit the bandwidth of reception signal to a first frequency smaller than the difference of 1 MHz from frequencies for neighboring channels, and further to a second frequency smaller than the first frequency, to obtain corresponding pulses, respectively. Preferably, the first frequency for the first filter 108 should be a band about 900 kHz a little narrower than the frequency interval between channels, and the second frequency for the second filter 109 should be a band about 150 kHz a little wider than the standard-compliant pulse width 100 kHz (±100 kHz).

Figure 7:
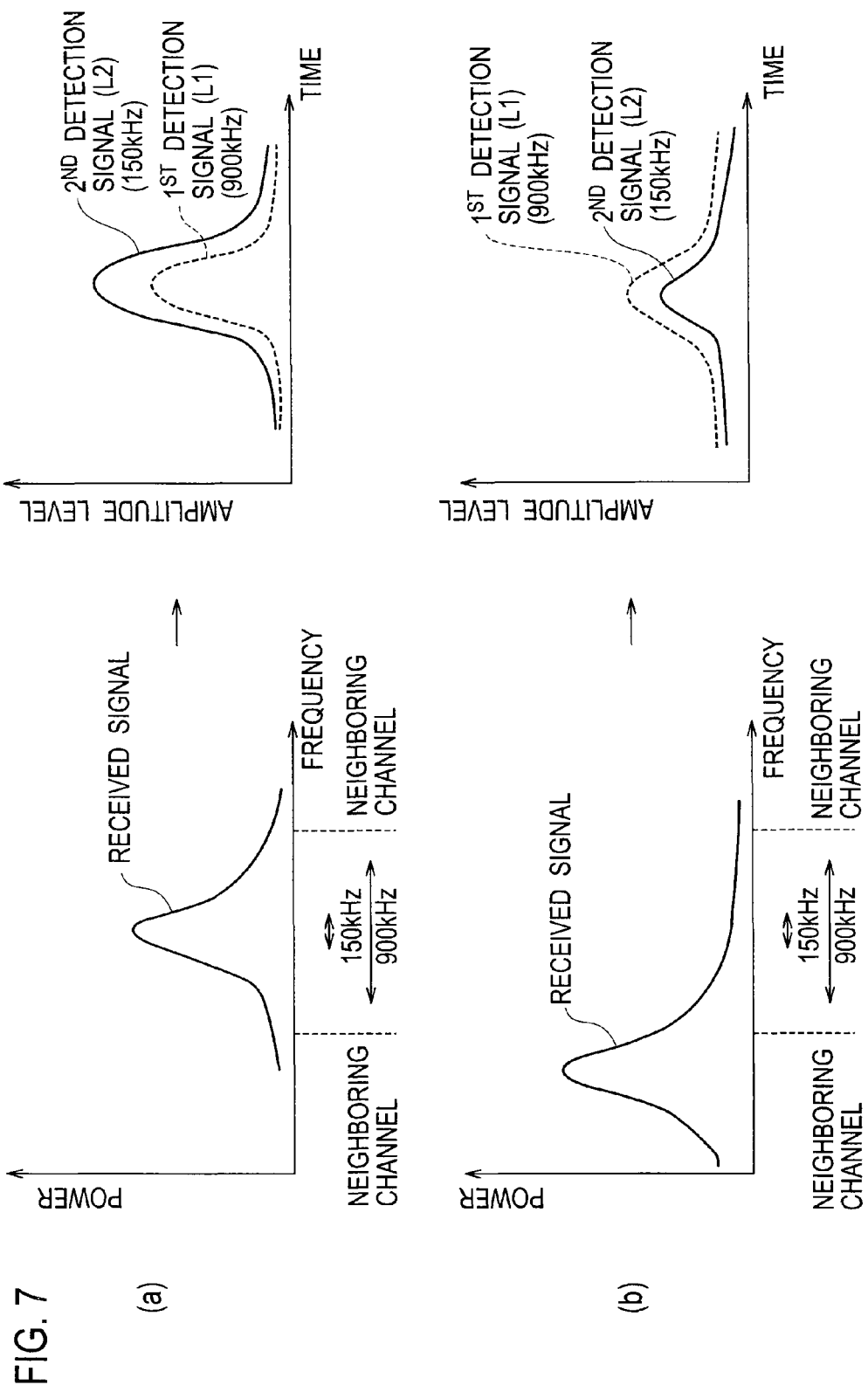
FIGS. 7(a) and 7(b) are graphs illustrating a concept of comparison of a comparator.

By provision of such the first frequency 900 kHz and the second frequency 150 kHz, the DME 5 is adapted to cope with any frequency of reception signal within a range to be processed at own equipment, to provide as illustrated in FIG. 7(a) a combination of a first detection signal L1 output from the first detector 110 and a second detection signal L2 output from the second detector 111, such that the former L1 is smaller than the latter L2. If the received signal is addressed to either neighboring channel, as illustrated in FIG. 7(b), the first detector 110 outputs a first detection signal L1 greater than a second detection signal L2 output from the second detector 111.

Accordingly, the comparator 112 comparing a first detection signal L1 input from the first detector 110 and a second detection signal L2 input from the second detector 111 is adapted to work, as shown in FIG. 8, if the comparison result is "L1≦L2", to determine the reception signal as being an "output inside channel", to output to the pulse detector 113 a combination of that reception signal and a "pulse detection control signal" for control to detect pulses from the reception signal. If the comparison result is "L1>L2", the comparator 112 works to determine the reception signal as being an "output outside channel", to output to the pulse detector 113 a combination of that reception signal and a "pulse detection suppression signal" as an instruction not to detect pulses from the reception signal.

As will be seen from the foregoing description, according to the present embodiment, a pulse detecting equipment 1 is adapted to handle a reception signal after a logarithmic conversion of signal levels with maintained frequency components. Accordingly, the pulse detecting equipment 1 is adapted to work without the need of signal separation into high levels and low levels even in a digital signal processing, thus allowing for pulse detection with a simplified equipment configuration. Further, DME may well be implemented with the pulse detecting equipment 1 for pulse detection with a simplified equipment configuration to respond to pulses transmitted to own equipment.

What is claimed is:

1. A pulse detecting equipment comprising:
    a logarithmic compression processor configured to logarithm-convert signal levels of a reception signal received at an antenna and input therefrom, with maintained frequency components of the reception signal as input;
    an AD (Analog/Digital) converter configured to convert the reception signal as logarithm-converted in signal level, from an analog form into a digital form;
    a first filter configured to limit the reception signal as converted into the digital form to a band of a prescribed first frequency to obtain a first signal;
    a second filter configured to limit the reception signal as converted into the digital form to a band of a prescribed second frequency smaller than the first frequency to obtain a second signal;
    a first detector configured to detect signal levels of the first signal;
    a second detector configured to to detect signal levels of the second signal; and
    a pulse detector configured for use of a result of comparison between first signal levels detected at the first detector and second signal levels detected at the second detector, to detect pulses of a prescribed frequency as a signal transmitted to own equipment.

2. The pulse detecting equipment according to claim 1, wherein the pulse detector is adapted to work:
    as the first signal levels are verified as being equal to or smaller than the second signal levels as the result of comparison, to determine the reception signal as being a signal of the prescribed frequency transmitted to own equipment, to detect from the reception signal said pulses of the prescribed frequency; and
    as the second signal levels are verified as being smaller than the first signal levels as the result of comparison, to determine the reception signal as not being any signal of the prescribed frequency transmitted to own equipment, not to detect said pulses.

* * * * *